(12) United States Patent
Oesch

(10) Patent No.: US 7,130,581 B2
(45) Date of Patent: Oct. 31, 2006

(54) WIRELESS DATA COMMUNICATION DEVICE AND COMMUNICATION SYSTEM INCLUDING SUCH A DEVICE

(75) Inventor: Yves Oesch, Neuchâtel (CH)

(73) Assignee: Asulab S.A., Marin (CH)

( * ) Notice: Subject to any disclaimer, the term of this patent is extended or adjusted under 35 U.S.C. 154(b) by 406 days.

(21) Appl. No.: 10/705,890

(22) Filed: Nov. 13, 2003

(65) Prior Publication Data

US 2004/0137937 A1 Jul. 15, 2004

(30) Foreign Application Priority Data

Nov. 13, 2002 (EP) ................................. 02080612

(51) Int. Cl.
*H04B 5/00* (2006.01)
*H04B 7/00* (2006.01)
*H04B 1/38* (2006.01)

(52) U.S. Cl. ................... 455/41.1; 455/41.2; 455/90.2; 455/90.3; 455/42

(58) Field of Classification Search ............... 455/41.1, 455/41.2, 41.3, 42–45, 567, 572, 575.6, 90.1–90.3, 455/59, 106, 347–349; 379/428.02, 433.1, 379/433.11, 441, 443, 447
See application file for complete search history.

(56) References Cited

U.S. PATENT DOCUMENTS

| | | | |
|---|---|---|---|
| 4,780,910 A * | 10/1988 | Huddleston et al. | 398/109 |
| 4,803,487 A * | 2/1989 | Willard et al. | 340/7.54 |
| 5,099,348 A * | 3/1992 | Huddleston et al. | 398/107 |
| 5,960,367 A * | 9/1999 | Kita | 455/567 |
| 6,172,608 B1 | 1/2001 | Cole | |
| 6,218,958 B1 * | 4/2001 | Eichstaedt et al. | 340/7.6 |
| 6,549,791 B1 * | 4/2003 | Jeon et al. | 455/572 |
| 2002/0071399 A1 | 6/2002 | Smith | |
| 2005/0014534 A1 * | 1/2005 | Hareng et al. | 455/567 |

FOREIGN PATENT DOCUMENTS

| DE | 100 26 173 A1 | 10/2001 |
|---|---|---|
| EP | 0 936 808 A1 | 8/1999 |

OTHER PUBLICATIONS

European Search Report for corresponding European application.

* cited by examiner

*Primary Examiner*—Duc M. Nguyen
(74) *Attorney, Agent, or Firm*—Griffin & Szipl, P.C.

(57) ABSTRACT

The wireless data communication device (1) is mounted in a portable object, such as a wristwatch. The device includes an oscillator circuit (6), which produces high frequency signals ($S_H$), and a signal processing unit (7), connected to the oscillator circuit. The connection structure of one part of the oscillator circuit (14, 15), which produces the high frequency signals, is arranged to act as antenna for the transmission of data by means of stray signals ($S_P$) transmitted by the connection structure. The processing unit provides a control signal ($C_C$) to the oscillator circuit depending upon the data to be transmitted by means of the stray signals by the connection structure. An amplitude modulation or a frequency modulation can be used for the transmission of data by means of the stray signals.

14 Claims, 4 Drawing Sheets

Figure 1A:
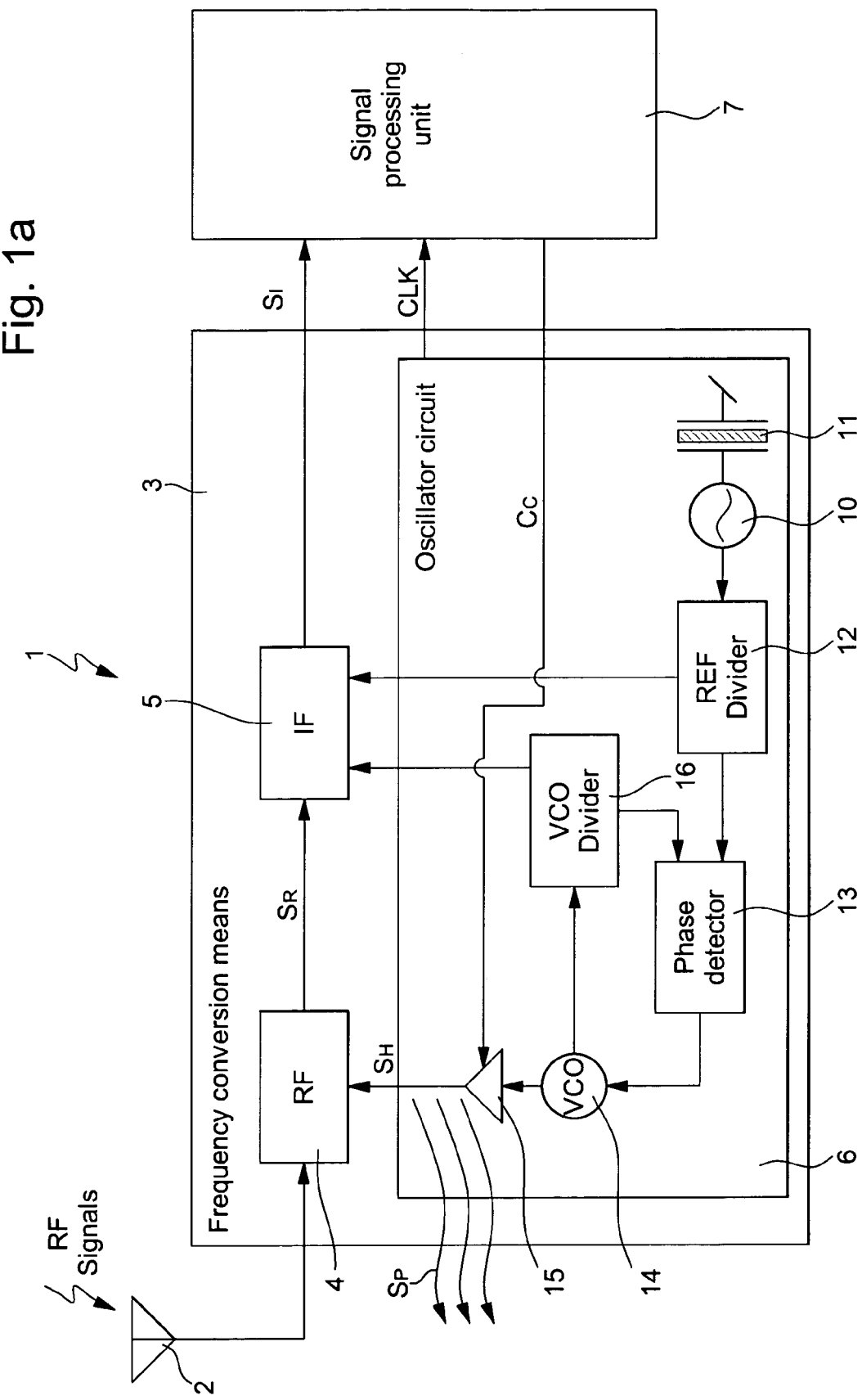

WIRELESS DATA COMMUNICATION DEVICE AND COMMUNICATION SYSTEM INCLUDING SUCH A DEVICE

This application claims priority from European Patent Application No. 02080612.1, filed Nov. 13, 2002, the entire disclosure of which is incorporated herein by reference.

The invention concerns a wireless data communication device. The communication device can form part of a portable object, such as a watch. The device includes an oscillator circuit, which produces high frequency signals, and a signal processing unit connected to the oscillator circuit.

The invention also concerns a short distance wireless system for communicating data between a communication device and an electronic apparatus.

"Data communication" means either a one-way transmission or a two-way transmission of information or data.

In the case of short distance data communication, the portable object, which includes the communication device, can be placed in proximity to or on the electronic apparatus. The signals generally transmitted during a short distance wireless data communication, can be radiofrequency signals, acoustic signals, optical signals or other signals. A combination of these different types of signals can also be envisaged.

Within the technical field of data communication, carrying out an exchange of data between two units close to each other, which each include transmission means and reception means for signals, particularly of the radiofrequency type, is known. Since these transmission means are generally different from the reception means, this requires the use of a significant number of electronic components. This can of course be a drawback if these transmission means and reception means have to be fitted to a portable object, such as a wristwatch. Moreover, such a portable object is generally powered by a battery or an accumulator, which also occupies a significant amount of place. The working of the signal transmission means and reception means involves significant electric power consumption, which can be a drawback, since the battery or accumulator is liable to be discharged too quickly.

It should be noted that even if the signal reception means are combined with the transmission means, the communication device has to be switched, either into data signal reception mode, or into data signal transmission mode, by additional electronic elements. This constitutes another drawback in addition to the electric power consumption, which can be relatively high.

DE Patent No. 100 26 173 discloses an arrangement for the transfer of electric signals between a base station and at least one external unit. The electric energy is transmitted by a transformer, whose primary winding or coil is placed in the base station and whose secondary winding or coil is placed in the external unit. A data communication can be achieved from the base station to the external unit using the transformer. A response signal is transmitted from the external unit to the base station by elements for coupling the station and the external unit. These inductive-type coupling elements are different to those of the transformer.

One drawback of such an arrangement is that it is necessary to provide the external unit with specific signal transmission means for data transmission. These transmission means are different from the reception means, which are formed particularly by the secondary transformer coil. Thus, even if the transformer can be used both for charging the accumulator and for data transmission, the additional electronic components of the external unit transmission means can take up considerable space and also consume too much electrical energy.

It is thus an object of the invention to provide a wireless data communication device, which overcomes the drawbacks of the aforementioned prior art and which, in particular, omits additional components to those used for carrying out the internal functions of the device.

The invention thus concerns a wireless data communication device, which includes the features mentioned in claim 1.

One advantage of the communication device according to the invention, lies in the fact that it is not necessary to provide said device with specific transmission means for the transmission of data. These transmission means are formed by the connection structure of one part of an oscillator circuit, which provides high frequency signals. The provision of high frequency signals automatically produces stray signals via the connection structure particularly through a circuit of conductive paths and connected electronic elements. This connection structure thus acts like a transmission antenna for stray signals. Thus, the stray signals can be used to transmit short distance data. Reception means of an electronic apparatus can pick up the stray signals transmitted by the connection structure of the oscillator circuit of the device over a distance that normally does not exceed several centimetres.

Advantageously, the communication device includes radiofrequency signal reception means, and frequency conversion means. These frequency conversion means include the oscillator circuit which can, in turn, include a frequency synthesiser connected to a reference oscillator unit. The synthesiser includes a voltage-controlled oscillator followed by an amplifier, which provides the high frequency signals, a frequency divider and a phase detector. The provision of high frequency signals by the oscillator circuit is thus necessary in the case of a radiofrequency signal receiver.

Using at least one control signal provided to the oscillator circuit by the processing unit, it is possible to transmit data by amplitude or frequency modulating the stray signals. Amplitude modulation of the stray signals is achieved by the control signal by connecting or disconnecting at least one element of the part of the circuit that provides the high frequency signals. This stray signal amplitude modulation allows a binary data sequence to be transmitted. The stray signal frequency modulation is achieved by at least one control signal preferably by modifying the division factor of one or two frequency dividers.

The invention therefore also concerns a wireless data communication system, which includes the features mentioned in claim 7.

Figure 1B:
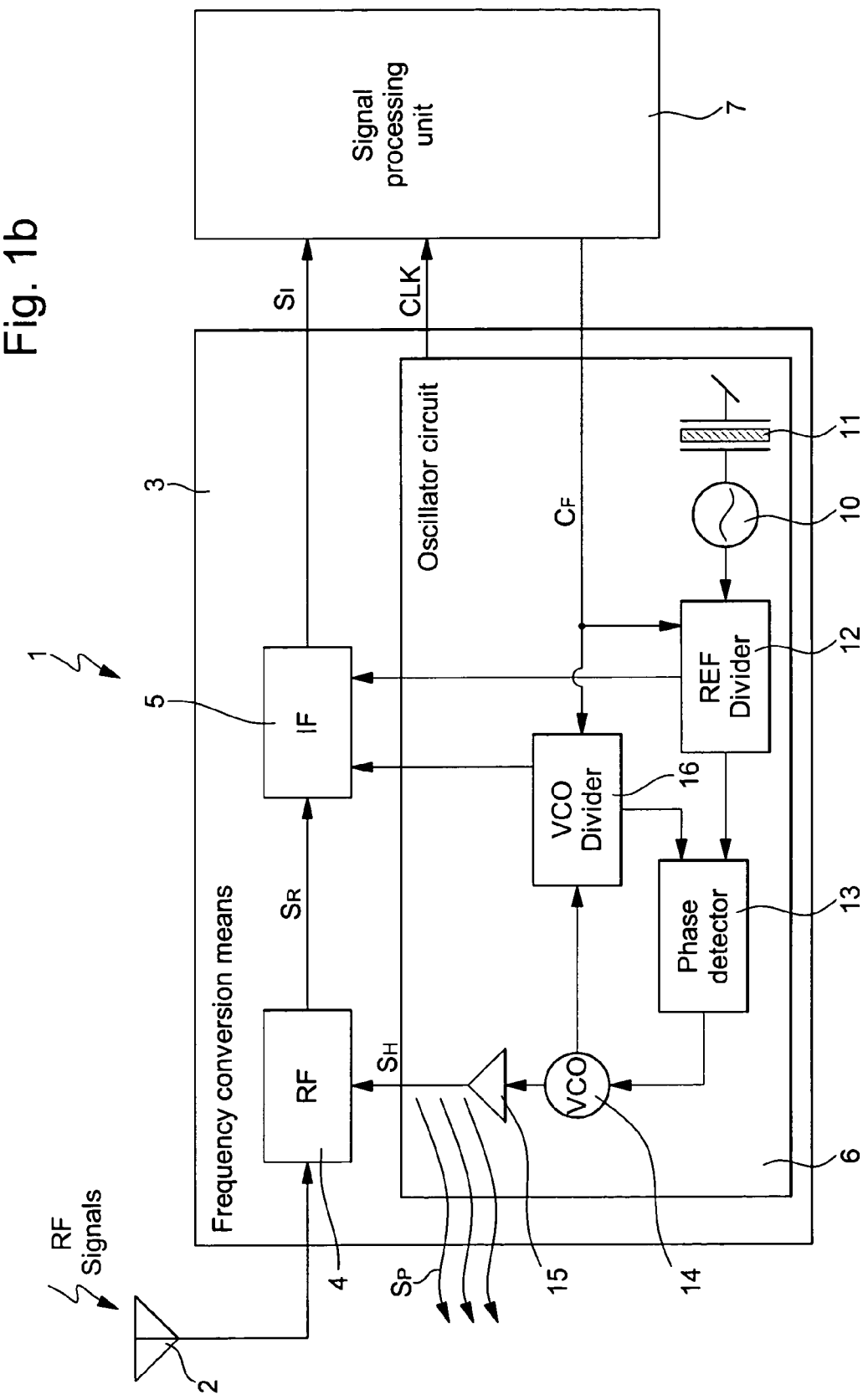
Figure 2:
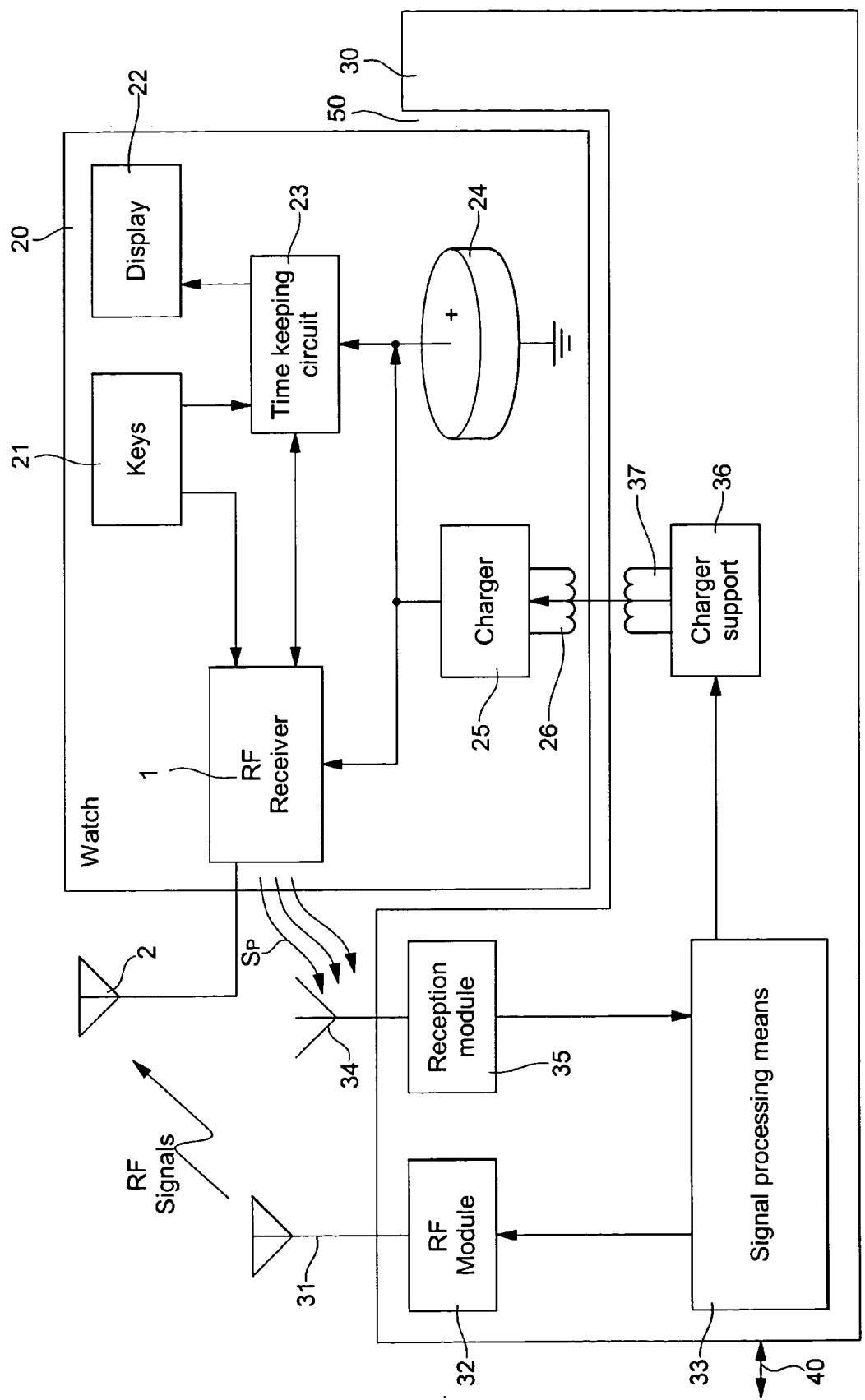
Figure 3A:
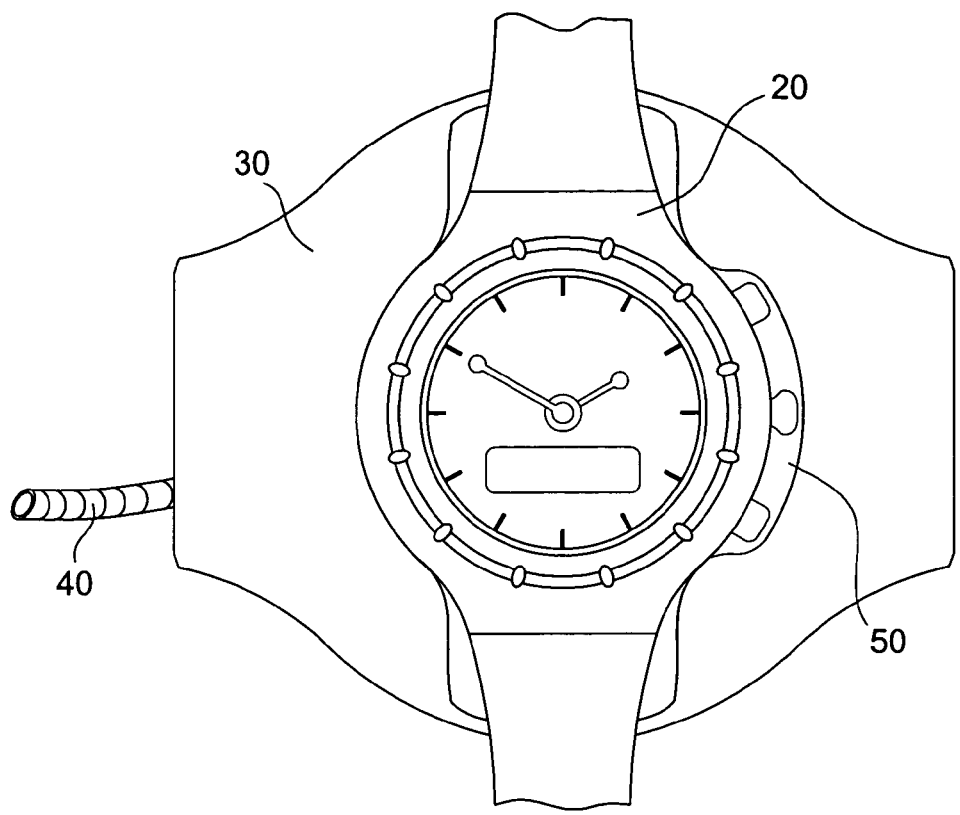
Figure 3B:
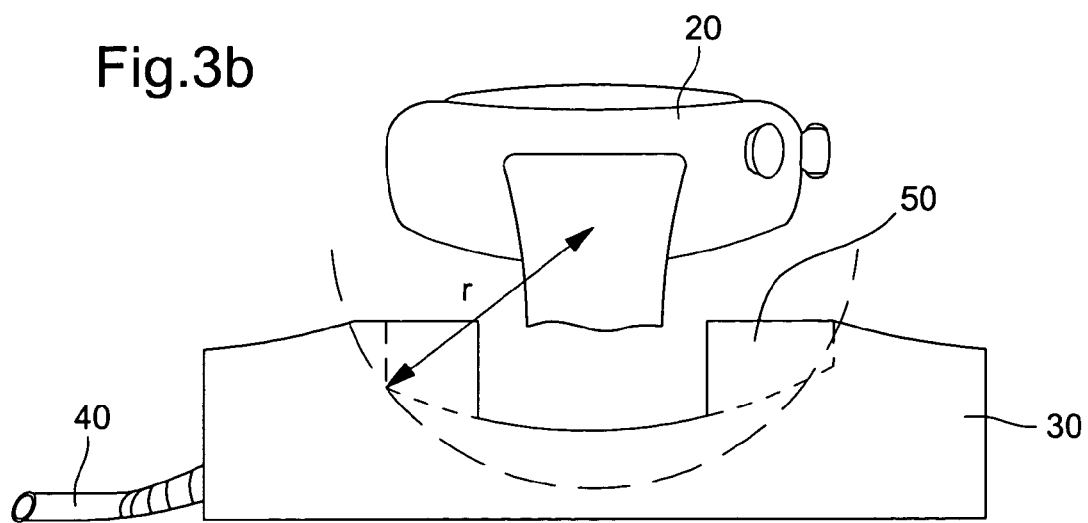

The objects, advantages and features of the wireless data communication device, and the communication system comprising said device will appear more clearly in the following description of embodiments of the invention in conjunction with the drawings, in which:

FIGS. 1a and 1b show schematically two alternative embodiments of the data communication device according to the invention, which is formed of a radiofrequency signal receiver, FIG. 2 shows schematically the components of a communication system including an electronic apparatus, such as an accumulator charger device and a portable object, in which the communication device is arranged, and FIGS. 3a and 3b show top and side views of the communication system, which includes a charger device and a watch with a data communication device according to the invention.

In the following description, all of the electronic components of the wireless data communication device or system, which are well known to those skilled in the art in this technical field, will not be explained in detail.

FIGS. 1a and 1b shows two different embodiments of data communication device 1. These two embodiments differ from each other solely in the way in which data is transmitted by means of stray signals produced by a connection structure of an oscillator circuit. In the first embodiment, the data is transmitted by modulating the amplitude of the stray signals, whereas in the second embodiment, the data is transmitted by modulating the frequency of the stray signals. This communication device is preferably formed by a radiofrequency signal receiver 1 which is housed in a portable object, such as a wristwatch.

This communication device 1 includes radiofrequency signal reception means 2, radiofrequency signal frequency conversion means 3, and a signal processing unit 7 receiving intermediate signals $S_I$ from the frequency conversion means. The reception means are represented by a reception antenna 2 in FIGS. 1a and 1b. It should be noted that the received radiofrequency signals are then filtered and amplified in the reception means.

Frequency conversion means 3 are used for lowering the frequency of the signals to be processed in processing unit 7. These frequency conversion means include at least two mixer circuits 4 and 5 for carrying out a double or triple frequency conversion of the radiofrequency signals. In order to carry out a double frequency conversion, first high frequency signals $S_H$ and second high frequency signals are provided from an oscillator circuit 6, respectively to mixer circuits 4 and 5. The connection structure of a part 14, 15 of this oscillator circuit, which provides the high frequency signals, is used as a data carrier stray signal transmission antenna as explained hereinafter. This connection structure includes both the electronic elements of the part of the oscillator circuit, and the conductive paths connecting the electronic elements to each other and to mixer circuit 4.

The first mixer circuit 4 receives the radiofrequency signals and the first high frequency signals $S_H$ in order to provide first converted signals $S_R$ to the second mixer circuit 5. The frequency ($F_{SR}$) of the first converted signals is equal, in absolute value, to the result of the subtraction of the frequency ($F_{SH}$) of the first high frequency signals from the frequency ($F_{RF}$) of the radiofrequency signals in accordance with the formula $F_{SR}=|F_{RF}-F_{SH}|$. The second mixer circuit 5 receives the first converted signals $S_R$ and the second high frequency signals of lower frequency than the first high frequency signals. This second mixer circuit 5 first of all provides second converted signals. The frequency of these second converted signals is equal to the result of the subtraction of the frequency of the second high frequency signals from the frequency of the first converted signals $S_R$. In this second mixer circuit, the second converted signals are sampled and quantified so as to provide intermediate signals $S_R$ to the processing unit.

Oscillator circuit 6 of the communication device includes a frequency synthesiser and an oscillator unit. The frequency synthesiser includes, in a phase lock loop, a voltage controlled oscillator 14 followed by an amplifier 15, which provides the first high frequency signals $S_H$, a first frequency divider 16 for the signals provided by the voltage controlled oscillator, and a phase detector 13. The phase detector 13 compares the frequency of the signals provided by the first frequency divider 16 and the frequency of the reference signals provided by the oscillator unit. In order to provide these reference signals, the oscillator unit is formed of a quartz crystal 11 or SAW (Surface Acoustic Wave) oscillator 10, followed by a second frequency divider 12. As a function of the comparison carried out in phase detector 13, an output voltage of phase detector 13 controls the VCO (voltage controlled oscillator) 14. The VCO thus produces high frequency signals whose frequency depends upon the output voltage of phase detector 13.

The reference SAW oscillator 10 can produce signals whose frequency ranges from 5 to 50 MHz, preferably from 17 to 18 MHz. A division factor of reference divider 12 can be equal to 4 in order to produce reference signals whose frequency is preferably between 4.25 and 4.5 MHz. The frequency of the first high frequency signals $S_H$ can be comprised between 100 MHz and 5 GHz. Preferably, the frequency of the first high frequency signals can be about 1.5 GHz when the radiofrequency signals are at a frequency, for example, of around 1.57 GHz. Thus, two frequency conversion operations through two mixers can be carried out in frequency conversion means 3. The intermediate signals $S_I$ have a frequency of the order of 400 kHz to enable them to be processed in processing unit 7.

Since the frequency of the first high frequency signals can be higher than one GHz, stray signals $S_P$ are automatically transmitted by the connection structure of the elements operating at this high frequency. Thus, by amplitude or frequency modulating first high frequency signals, it is possible to transmit data by means of said stray signals. The predominant frequency of the stray signals is approximately equal to the frequency of the first high frequency signals.

If the communication device is a GPS type radiofrequency signal receiver, signal processing unit 7 includes a correlation stage provided with at least one correlation channel, a microprocessor and storage means, which are not shown. In the correlation stage, these intermediate signals $S_I$ are processed for example in the well known pseudo-random code control loop and carrier control loop. The data extracted by the microprocessor from the correlation stage can be stored in the memory means, for example, and used for any calculation operations.

The communication device can also be capable of receiving CDMA (Code-Division Multiple Access) type radiofrequency signals. Consequently, signal processing unit 7 has to be arranged for extracting the data contained in the radiofrequency signals.

Signal processing unit 7 is clocked by clock signals CLK provided by oscillator circuit 6 of frequency conversion means 3. These clock signals CLK can be made up of a first clock signal whose frequency is approximately 4.5 MHz, and a second clock signal whose frequency is approximately 250 kHz. The first clock signal is used essentially in the correlation stage, whereas the second clock signal is used in the correlation stage and in the microprocessor.

Once the data from the radiofrequency signals has been processed by signal processing unit 7, a confirmation that these radiofrequency signals have been properly received can be transmitted by means of stray signals $S_P$. In order to do this, a control signal, dependent on the data to be transmitted, is provided by signal processing unit 7 to oscillator circuit 6.

In FIG. 1a, control signal $C_C$ is preferably applied to amplifier 15 of the part of the oscillator circuit that produces the first high frequency signals $S_H$ The amplifier, which forms part of the connection structure, is connected or disconnected by control signal $C_C$ as a function of the data to be transmitted by means of stray signals $S_P$. Consequently, the stray signals are amplitude modulated so as to transmit a binary data sequence via such modulation. One binary element of the binary sequence has a value of 1 when the amplitude of the stray signals is maximum, whereas one binary element of the binary sequence has a value of 0 when the amplitude of the stray signals is close to 0. This amplitude modulation by connecting or disconnecting amplifier 15 is called an OOK (On-Off Keying) modulation.

The flow of data transmitted by means of the stray signals can be relatively slow, since the voltage controlled oscillator start time is generally slow. The binary sequence flow can be estimated at 1 bit/10 ms. Consequently, data transmission by means of the stray signals by amplitude modulation can be relatively long depending upon the quantity of data to be transmitted.

In order to transmit the data by amplitude modulation, one could also envisage acting on the electric power supply of several electronic elements of oscillator circuit 6. For example, one could envisage that the control signal allows to connect or disconnect the first frequency divider 16, phase detector 13, voltage controlled oscillator 14 or a combination of these elements.

In FIG. 1b, at least one control signal $C_F$ is applied preferably to the first and second frequency dividers 16 and 12 in order to act on the division factors as a function of the data to be transmitted. The effect of modification of the division factors is to modify the frequency of the first high frequency signals. Thus, it is possible to achieve a frequency modulation of the stray signals for the data transmission. This frequency modulation for the transmission of data by means of stray signals is called an FSK (Frequency Shift Keying) modulation. As in this case, voltage controlled oscillator 14 is not disconnected, the flow of data to be transmitted can be greater than in the case of amplitude modulation.

Of course, the transmission of data by means of stray signals can only occur at a short distance. A stray signal reception apparatus cannot be further than several centimetres from a portable object, which includes the communication device, to pick up the stray signals.

FIG. 2 shows the electronic components of a wireless data communication system. The system includes, in this example, an electronic apparatus 30 and a watch 20 provided with the communication device according to the invention. Electronic apparatus 30 constitutes a support for watch 20. Electronic apparatus 30 thus includes a housing 50 for receiving the watch. This housing 50 is preferably fitted to the external dimension of the watch so as to place the watch in a determined position in the housing of apparatus 30 for the communication of data.

Watch 20 includes, in particular, data communication device 1, which is, in this case, a radiofrequency signal receiver with an antenna 2. The watch also includes a timekeeping circuit 23, control keys 21, a display 22 for the time or for received or transmitted data, a rechargeable battery or accumulator 24 and a charger 25 having a secondary coil 26. The control keys allow action both on the timekeeping circuit particularly for setting the time and date, and on the radiofrequency signal receiver, particularly for switching said receiver on. Charger 25 enables the battery or accumulator to be recharged in cooperation with a charger of electronic apparatus 30. Charger 25 is operational when the level of voltage detected in the battery or accumulator is no longer sufficient to ensure that all the functions of the watch will work properly.

The electronic apparatus, which is also used as a charger device for a battery or accumulator of a portable object, essentially includes an RF module 32 for transmitting data by means of radiofrequency signals via an antenna 31, a reception module 35 for stray signals $S_P$ via an antenna 34, a main charger 36 of the support apparatus having a primary coil 37, and signal processing means 33, which are connected to all of the electronic elements of the apparatus. The radiofrequency signals transmitted by antenna 31 are picked up by antenna 2 of the radiofrequency signal receiver of watch 20.

Chargers 25 and 36, and their coil 26 and 37 constitute a charge module in which coil 37 forms the primary coil of the transformer, whereas the coil 26 forms the secondary coil of said transformer. When the voltage level of the battery or accumulator of the watch is no longer sufficient a battery or accumulator charging operation is carried out. Data concerning the end of battery or accumulator charging can be transmitted by means of the stray signals. The end of battery or accumulator charging can also be indicated on the apparatus by an electroluminescent diode. Data concerning the proper reception of the radiofrequency signal data can also be transmitted by means of the stray signals.

It should be noted that the battery or accumulator charging module could be independent of the data communication between the communication device of the watch and the electronic apparatus. A battery or accumulator charging operation can be carried out without the communication device of the watch being switched on.

Signal processing means 33 can store the data received by reception module 35 or provide RF module 32 with the data to be transmitted by means of the radiofrequency signals. Other data can also be exchanged by a connection cable 40 with another unit connected to the apparatus. The electronic apparatus can be directly connected to a computer station for example.

FIGS. 3a and 3b show top and side views of the data communication system, which includes the electronic support apparatus 30 and wristwatch 20. Wristwatch 20 can be placed in a determined position in housing 50 of the support apparatus as a function of the position of the signal reception and transmission means of each unit. As shown in FIG. 3b for the reception of stray signals, the watch can only be moved away by a maximum distance r from the reception module of the apparatus. This distance is of the order of several centimetres.

Electronic apparatus 30 can be connected to an electric power plug by cable 40 or connected to a computer station not shown for the communication of data.

From the description that has just been given, multiple variants of the communication device and the communication system can be conceived by those skilled in the art without departing from the scope of the invention defined by the claims. The frequency modulation can be achieved by modifying the division factor either of the first divider, or the second divider. The data signals transmitted by the electronic apparatus can be acoustic signals, optical signals or other types of signals. The frequency conversion means of the communication device can include only one mixer circuit and one oscillator circuit.

What is claimed is:

1. A wireless data communication device particularly for a portable object, the device including an oscillator circuit, which produces high frequency signals, and a signal processing unit connected to the oscillator circuit, wherein a connection structure of one part of the oscillator circuit, which produces the high frequency signals, is arranged to act as antenna for the transmission of data by means of stray signals transmitted by the connection structure, wherein the processing unit provides at least one control signal to the oscillator circuit, said control signal depending upon the data to be transmitted by means of the stray signals, and wherein the oscillator circuit includes a frequency synthesiser connected to a reference oscillator unit, the synthesiser including, in a phase lock loop, a voltage controlled oscillator, followed by an amplifier, which provides high frequency signals, a frequency divider for signals provided by the voltage controlled oscillator, and a phase detector comparing the frequency of the signals provided by the frequency divider and the frequency of the reference signals provided by the reference oscillator unit, the output of the phase detector being connected to the voltage controlled oscillator, and wherein the control signal, provided by the processing unit, controls the switching on or off of the amplifier for the transmission of data by amplitude modulation of the stray signals.

2. A communication device according to claim 1, wherein the processing unit provides a control signal to the part of the oscillator circuit that produces high frequency signals, so as to control the switching on or off of at least one electronic element of said part of the oscillator circuit in order to carry out amplitude modulation of the stray signals, said modulation depending upon the data to be transmitted by the connection structure.

3. A communication device according to claim 1, wherein the processing unit provides a control signal to the oscillator circuit in order to carry out a frequency modulation of the stray signals, whose frequency is based on the frequency of the high frequency signals, said modulation depending upon the data to be transmitted by the connection structure.

4. A communication device according to claim 1, wherein the communication device further includes radiofrequency signal receiving means, and radiofrequency signal frequency conversion means, wherein the oscillator circuit generates high frequency signals for the frequency conversion, the processing unit receiving frequency converted intermediate signals from the frequency conversion means in order to extract the received data.

5. A short distance wireless data communication system between a communication device according to claim 1 and an electronic apparatus, wherein the apparatus includes stray signal receiving means and signal processing means connected to the receiving means in order to extract the data from the stray signals transmitted by the device when the device is placed in proximity to the apparatus.

6. A communication system according to claim 5, wherein the communication device forms part of a portable object, wherein the electronic apparatus includes a housing for receiving the portable object so that the apparatus constitutes a support for the portable object.

7. A communication system according to claim 6, wherein the support apparatus and the portable object include inductive type charging means for a battery or an accumulator of the portable object, the charging means including a transformer, whose first coil forming the primary winding of the transformer, is arranged in the apparatus, and whose second coil forming the secondary winding of the transformer, is arranged in the portable object.

8. A communication system according to claim 7, wherein the device is arranged for transmitting data to the apparatus, by means of stray signals, relating to the end of the portable object's battery or accumulator charging operation.

9. A communication system according to claim 6, wherein the portable object is a watch.

10. A communication system according to claim 5, wherein the electronic apparatus includes radiofrequency transmitting means for transmitting data to the device, which includes radiofrequency signal receiving means, and wherein the processing unit of the device provides a control signal to the oscillator circuit of the device for the transmission, by means of stray signals, of a confirmation of the data received in the radiofrequency signals.

11. A wireless data communication device particularly for a portable object, the device including an oscillator circuit, which produces high frequency signals, and a signal processing unit connected to the oscillator circuit, wherein a connection structure of one part of the oscillator circuit, which produces the high frequency signals, is arranged to act as antenna for the transmission of data by means of stray signals transmitted by the connection structure, wherein the processing unit provides at least one control signal to the oscillator circuit, the control signal depending upon the data to be transmitted by means of the stray signals, and wherein the oscillator circuit includes a frequency synthesiser connected to a reference oscillator unit, said synthesiser including, in a phase lock loop, a voltage controlled oscillator, followed by an amplifier, which provides high frequency signals, a frequency divider for the signals provided by the voltage controlled oscillator, and a phase detector comparing the frequency of the signals provided by the frequency divider and the frequency of the reference signals provided by the reference oscillator unit, the output of the phase detector being connected to the voltage controlled oscillator, and wherein the processing unit provides the control signal to the frequency divider so as to modify the division factor of the divider for the transmission of data by frequency modulation of the stray signals.

12. A short distance wireless data communication system between a communication device and an electronic apparatus; wherein the communication device is a wireless data communication device for a portable object, the device includes an oscillator circuit, which produces high frequency signals, and a signal processing unit connected to the oscillator circuit, wherein a connection structure of one part of the oscillator circuit, which produces the high frequency signals, is arranged to act as antenna for the transmission of data by means of stray signals transmitted by the connection structure, and wherein the processing unit provides at least one control signal to the oscillator circuit, the control signal depending upon the data to be transmitted by means of the stray signals; wherein the apparatus includes stray signal receiving means and signal processing means connected to the receiving means in order to extract the data from the stray signals transmitted by the device when the device is placed in proximity to the apparatus; and wherein the communication device forms part of a portable object, wherein the portable object is a watch, and wherein the electronic apparatus includes a housing for receiving the watch so that the apparatus constitutes a support for the watch.

13. A communication system according to claim 12, wherein the support apparatus and the portable object include inductive type charging means for a battery or an accumulator of the portable object, the charging means including a transformer, whose first coil forming the primary winding of the transformer, is arranged in the apparatus, and whose second coil forming the secondary winding of the transformer, is arranged in the portable object.

14. A communication system according to claim 13, wherein the device is arranged for transmitting data to the apparatus, by means of stray signals, relating to the end of the portable object's battery or accumulator charging operation.

* * * * *